July 13, 1965 R. C. BENNETT 3,194,370
ROTARY DRIVING TOOL WITH VARIABLE PITCH SPRING
Filed July 25, 1962
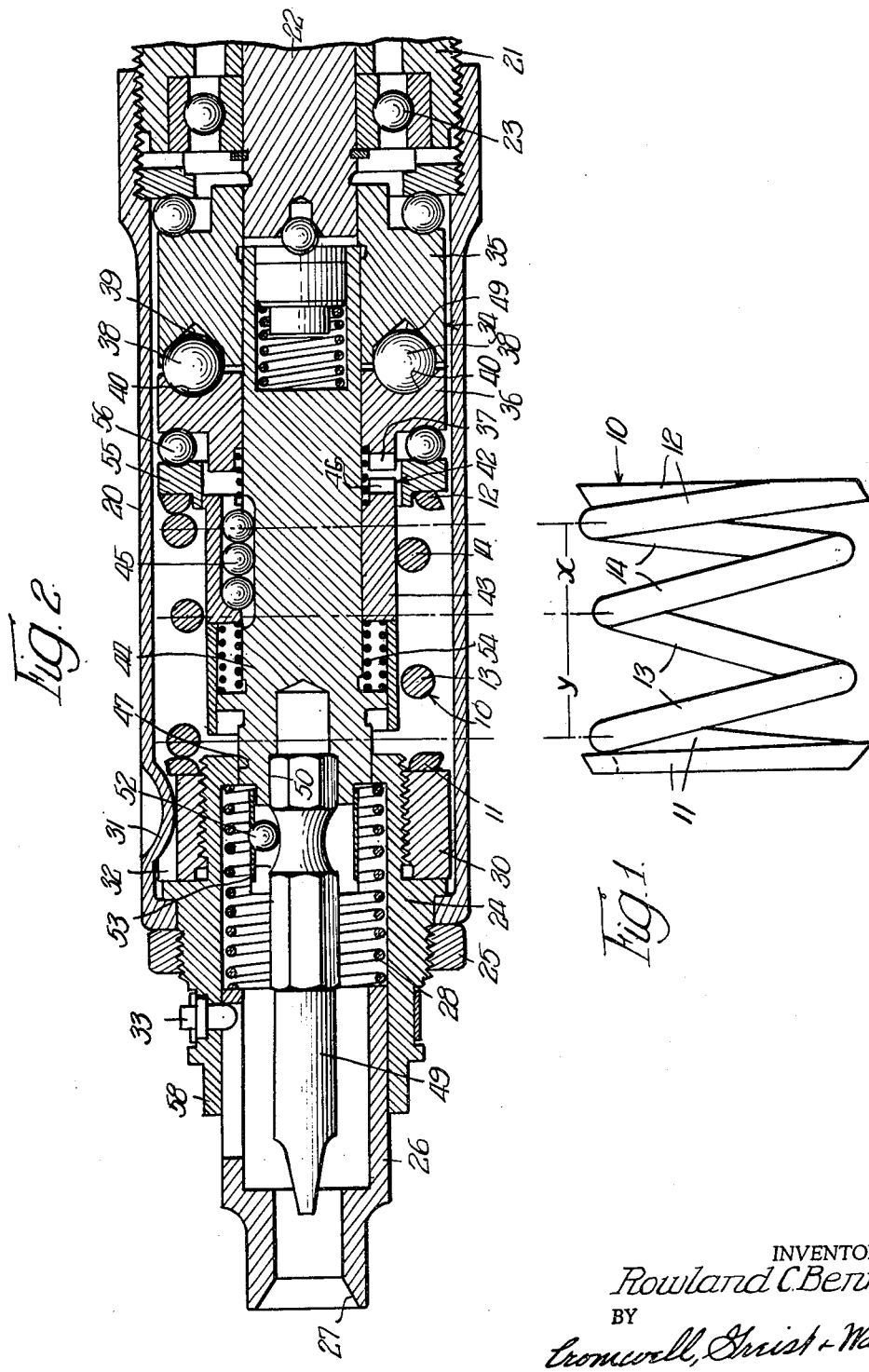
INVENTOR.
*Rowland C. Bennett,*
BY
*Cromwell, Greist & Warden*
ATTYS

United States Patent Office 3,194,370
Patented July 13, 1965

3,194,370
ROTARY DRIVING TOOL WITH VARIABLE
PITCH SPRING
Rowland C. Bennett, Palatine, Ill., assignor to Skil Corporation, Chicago, Ill., a corporation of Delaware
Filed July 25, 1962, Ser. No. 212,296
4 Claims. (Cl. 192—56)

The present invention relates to a spring and, more particularly, to a variable pitch spring for use in a rotary driving tool.

In rotary driving tools, such as the one disclosed in U.S. Patent No. 3,020,789, dated February 13, 1962, a standard compression coil spring normally used therein as a torque control spring is effective for rotary driving operations within a specified range of work, for instance from 18 to 50 inch-pounds. For rotary driving operations above and below such work limitations, it has been necessary in the past for the operator to shut down the tool and substitute springs having greater or lesser compression ratings for the standard spring therein, thus resulting in considerable undesirable tool down-time and extra work on the part of the operator.

It is, therefore, an important object of the present invention to provide a new and improved compression coil spring wherein the pitch of the spring varies along its length, which variable pitch spring is adapted for use in such a rotary driving tool to permit efficient operation and sensitive adjustment of same under both relatively light and relatively heavy driving conditions within a considerably extended work range, for instance from 1 to 100 inch-pounds as compared with a work range of 18 to 50 inch-pounds for a standard non-variable pitch coil spring of comparable size.

Another important object of the present invention is to provide a new and improved variable pitch compression spring of the character described having both soft and hard coils and having a generally hour-glass configuration to prevent swelling of the center of the spring when same is compressed.

A further object of the present invention is to provide a new and improved variable pitch compression spring of the character described for use in a rotary driving tool whereby to eliminate the wasteful down-time normally required for an operator to change compression springs when switching over from exceedingly light driving operations to heavy industrial driving operations and vice versa.

Certain other objects of the invention will, in part, be obvious, and will in part appear hereinafter.

For a more complete understanding of the nature and scope of the invention reference may now be had to the accompanying drawings wherein:

FIG. 1 is a side elevational view of a variable pitch spring embodying a preferred form of the invention and having a generally hour-glass configuration; and FIG. 2 is a central section taken through a rotary driving tool utilizing the variable pitch compression spring of FIG. 1.

As illustrated in FIG. 1, a variable pitch spring 10 embodying the invention is characterized by a series of coils including opposite end coils 11 and 12 and intermediate or center coils 13 and 14. The ends of the end coils 11 and 12 may be chamfered in a known manner. As illustrated, the pitch or distance $x$ between corresponding points on the coils 12 and 14 at one end of the spring 10 is less than the pitch or distance $y$ between the coils 11 and 13 at the opposite end of the spring 10 whereby the coil compression spring 10 is provided with variable pitch characteristics. Coil 13 having the greater pitch acts as a hard coil and is adapted particularly for heavy driving operations and coil 14 having the lesser pitch acts as a soft coil and is adapted particularly for light driving operations. The variable pitch spring 10 is effective, for instance, within a range of 1 to 100 inch-pounds of work as compared with a range of 18 to 50 inch-pounds of work for a standard non-variable pitch compression spring having comparable physical characteristics. The actual work-load range for the variable pitch spring 10 is determined, of course, by the particular physical characteristics thereof, such as the spring material, the free length of the spring, the wire and coil diameters, the number of coils, etc.

Compression coil springs normally swell or bulge at their centers when fully compressed, which characteristics may be extremely undesirable in certain circumstances, as where the spring is closely confined and any swelling might result in rubbing or interference with the normal operation thereof. Therefore, as illustrated in FIG. 1, the outer diameters of the coils of the spring 10 decrease progressively in directions inwardly of the opposite end coils 11 and 12 whereby the spring 10 has a generally hour-glass configuration or shape. Thus when the spring 10 is fully compressed, the center coils 13 and 14 do not swell or bulge outwardly so far that they extend beyond the outer diameter of the end coils 11 and 12.

The variable pitch compression spring 10 is particularly well adapted for use in a rotary driving tool such as the one which is fully disclosed in detail in U.S. Patent No. 3,020,789, dated February 13, 1962. Briefly, as illustrated in FIG. 2, such a tool includes a sleeve-like casing 20 which is mounted at its rear end on an adapter or front end portion 21 of a rotary power tool of a known type (not shown) with a drive shaft 22 thereof projecting forwardly into the casing 20 with its projecting end being supported in a ball bearing 23. A sleeve member 24 is mounted in the front end of the casing 20 for rotation relative thereto, for a purpose which will be described hereinafter, with a jam or locking nut or ring 25 being provided for locking the sleeve member 24 in an adjusted position. A finder sheath 26 having an outwardly flared forward end 27, which serves as a guide for placement thereof over a fastener such as a screw, is telescopically mounted in the forward end of the sleeve 24 with a spring 28 normally urging the finder sheath 26 in a forward direction relative thereto. The sheath 26 is retained in the sleeve 24 by a known type spring detent 33. An adjusting nut 30 is threadedly mounted on the inner or rear end of the sleeve 24, which nut 30 is held against rotation relative to the casing 20 by a detented portion 31 of the casing 20 which extends into a longitudinally extending slot 32 formed in the adjusting nut 30.

A torque control clutch 34 which is rotatably mounted in the rear portion of the casing 20 includes a power-receiving clutch member 35 which is drivingly connected to the forward end of the power tool drive shaft 22 by a known type hex drive arrangement and a driven clutch member 36 having a series of clutch teeth 37 on its forward end. Cam means for drivingly interconnecting the power-receiving clutch member 35 and the driven clutch member 36 are preferably in the form of a series of bearing balls 38 which are disposed therebetween and seated in specially designed recesses 39 and 40 formed therein, respectively, as described in detail in the previously referred to Patent No. 3,020,789. Normally the driven clutch member 36 is in a closed position and juxtaposed to the clutch member 35 in driving engagement therewith, as illustrated in FIG. 2. It will be seen that when torque is applied between the clutch members 35 and 36 there will be a tendency for the bearing balls 38 to cam out of the recesses 40 since they are somewhat shallower and of a different shape than the recesses 39. This camming tendency increases as the torque increases.

In addition to the torque control clutch 34, a positive engagement clutch 42 is provided including a collar-like member 43 which is keyed on a spindle 44 by a ball key 45 for axial movement relative thereto and which is provided at its rear or inner end with a series of clutch teeth 46 which are adapted for engagement with the clutch teeth 37 on the driven clutch member 36.

The spindle 44, which is mounted within the casing 20 for rotation and limited axial movement relative thereto, is supported at its forward end in an annular bearing surface 47 which is provided at the rear or inner end of the sleeve 24 with the rear end of the spindle 44 extending through the driven clutch member 36, which is centrally bored, and into a central bore formed in the power-receiving clutch member 35, the spindle 44 being freely rotatable relative to the clutch members 35 and 36. A driving bit 49 has its rear end mounted in a socket 50 which is formed in the front end of the spindle 44 for rotation therewith with a known type ball detent 52 and a garter-like clip 53 being provided to releasably retain the bit 49 in the socket 50.

A compression spring 54 normally urges the collar-like member 43 into its rearwardmost position relative to the spindle 44, as determined by the ball key 45, in which position the clutch teeth 46 thereon are spaced forwardly of and not engaged with the clutch teeth 37 on the driven clutch member 36 when same is juxtaposed to the power-receiving clutch member 35. The variable pitch torque control spring 10 of the invention, previously described in detail herein, has its end coil 11 seated against the rear surface of the adjusting nut 30 and its opposite end coil 12 seated against an annular seat member 55 which abuts against the front end of the driven clutch member 36 through a known type thrust bearing 56, whereby the driven clutch member 36 is normally urged rearwardly into driving engagement with the power-receiving clutch member 35.

In use with the driving tool motor operating, the finder sheath 26 is pressed against a fastener member to be drivingly rotated, such as a screw, the head thereof being seated in centered relationship in the outwardly flared end 27 of the sheath 26, whereby the sheath 26 is shifted rearwardly against the force of the spring 28 until the tip of the bit 49 is engaged in a recess in the screw head. During the foregoing, the switch members 35 and 36 of the torque control clutch 34 have been rotating but the other parts have remained stationary. Further pressure against the screw causes rearward axial movement of the spindle 44, as a result of the engagement of the rear end of the bit 49 against the inner end of the socket 50 therein, wtih the spring 54 simultaneously shifting the collar-like member 43 rearwardly as the spindle 44 is moved rearwardly until the clutch teeth 46 thereon are interlocked in driving engagement with the clutch teeth 37 on the rotating driven clutch member 36. With positive clutch 42 thus engaged, the spindle 44 and the bit 49 are rotatably driven to drive the screw or other fastener.

The driving continues until such time as the fastener is driven to the point where the torque exceeds the predetermined torque value for which the torque control clutch 34 has been set, this torque value being determined by the compression of the torque control spring 10 which is adjustable by the adjusting nut 30 in a manner which will be described. When this predetermined torque value is exceeded, the bearing balls 38 cam out of the shallow recesses 40 in the driven clutch member 36 whereby the driven clutch member 36 is shifted forwardly against the force of the torque control spring 10 with the collar-like member 43 likewise being shifted forwardly.

The torque control spring 10 instantaneously shifts the annular seat member 55 and the driven clutch member 36 rearwardly to reseat the bearing balls 38 in the recesses 40 therein whereby to again engage the torque control clutch 34. However, the collar-like member 43 is retained in its forwardly shifted position whereby its clutch teeth 46 are completely disengaged from the clutch teeth 37 on the driven clutch member 36. As is described and illustrated in detail in U.S. Patent No. 3,020,789, previously referred to herein, latch balls (not shown in FIG. 2), for instance may be provided to automatically retain the collar-like member 43 in its forwardly shifted position out of driving engagement with the torque control clutch 34 after the instantaneous disengagement thereof upon the predetermined torque value being exceeded.

As long as pressure is retained against the screw head, the parts will remain in the foregoing positions with only the torque control clutch 34 rotating and all of the other parts being stationary. Upon release of the pressure against the screw head, the several springs cause the parts to resume their initial positions.

It should be noted again that the specific structure of the rotary driving tool, for instance the means for automatically releasably latching the positive clutch 42 in its disengaged condition after the predetermined torque value has been exceeded whereby to prevent further driving of the fastener, comprises no part of the present invention and that therefore the structure and operation of the rotary driving tool have only been briefly described herein.

The compression of the torque control spring 10 and thus the predetermined torque value at which the torque control clutch 34 is to be disengaged may be varied by the adjusting nut 30. The longitudinal position of the adjusting nut 30 relative to the casing 20 may be readily adjusted by first loosening the locking ring 25 after which the sleeve 24 is rotated by means of wrench-engageable flats 58 provided on the forward end thereof whereby the adjusting nut 30, which is restrained against rotation relative to the casing 20 by the detented portion 31 thereof, is adjusted longitudinally of the casing 20 to increase or decrease the compression of the torque control spring 10.

When a standard non-variable compression coil spring is used as a torque control spring in such a rotary driving tool, the range of compression of the spring and thus the range of possible torque values for disengagement of the torque control clutch 34 are relatively limited. Thus, for both relatively light driving operations and relatively heavy industrial driving operations, it has been necessary, in the past, for an operator to shut down the tool, disassemble same and substitute a spring having a lesser or greater compression rating than that of the standard coil spring normally provided in a rotary driving tool of this type.

However, as previously described in detail herein, the variable pitch compression coil spring 10 of the present invention provides an extended range of torque control spring compression and thus an extended range of possible torque values for disengagement of the torque control clutch 34 whereby relatively light and relatively heavy driving operations, as well as normal driving operations, may be efficiently handled by the rotary driving tool without the necessity of the operator shutting down the tool and changing the torque control spring therein. It is noted that an extended work-load range for a typical variable pitch compression coil spring of the invention as compared with the work-load range of a standard non-variable pitch compression coil spring of comparable size has previously been set forth herein. It is further noted that the hard or greater pitch coil 13 of the variable pitch torque control spring 10 particularly facilitates extremely sensitive control of the compression thereof and thus permits fine adjustment of a desired predetermined torque value for disengagement of the torque control clutch 34.

It will be understood that certain changes may be made in the construction or design of the variable pitch coil spring disclosed herein without departing from the spirit and scope of the invention as defined in the appended claims.

I claim:
1. In a rotary driving tool characterized by a sleeve-like casing, by a spindle therein having a driver supporting means at its forward end, by a driven clutch member connectable to said spindle for rotatably driving same, by a rotatable power-receiving clutch member, by completely disengageable camming means normally directly interconnecting said clutch members and tending to separate said driven clutch member from said power-receiving clutch member at a predetermined torque value, and by torque value adjusting means, the improvement which comprises, a compression coil spring within said casing characterized by a series of coils with one or more coils at one end thereof having a greater pitch than the pitch of one or more coils at the opposite end thereof whereby said coils at said one end are adapted particularly for heavy driving conditions and said coils at said opposite end are adapted particularly for light driving conditions, said spring urging said driven clutch member into driving engagement with said power-receiving clutch member and resisting separation by said camming means until a predetermined torque value is exceeded, the degree of compression of said spring and thus said predetermined torque value being adjustable by said torque value adjusting means through a relatively wide range due to the variable pitch characteristics of said spring.

2. In a rotary driving tool characterized by a sleeve-like casing, by a spindle therein having a driver supporting means at its forward end, by a driven clutch member connectable to said spindle for rotatably driving same, by a rotatable power-receiving clutch member, by completely disengageable camming means normally directly interconnecting said clutch members and tending to separate said driven clutch member from said power-receiving clutch member at a predetermined torque value, and by torque value adjusting means, the improvement which comprises, a compression coil spring within said casing characterized by a series of coils with one or more coils at one end thereof having a greater pitch than that of one or more coils at the opposite end thereof whereby said coils having the greater pitch are adapted particularly for heavy driving conditions and said coils having the lesser pitch are adapted particularly for light driving conditions, the outer diameters of all of the coils of said spring decreasing progressively from the opposite ends of the spring inwardly toward the center thereof whereby said variable pitch spring has a slightly hour-glass configuration, said spring urging said driven clutch member into driving engagement with said power-receiving clutch member and resisting separation by said camming means until a predetermined torque value is exceeded, the degree of compression of said spring and thus said predetermined torque value being adjustable by said torque value adjusting means through a relatively wide range due to the variable pitch characteristics of said spring.

3. In a rotary driving tool characterized by a sleeve-like casing, by a spindle therein having driver supporting means at its forward end, by a driven clutch member connectable to said spindle for rotatably driving same, by a rotatable power-receiving clutch member, by completely disengageable camming means normally directly interconnecting said clutch members and tending to separate said driven clutch member from said power-receiving clutch member at a predetermined torque value, and by torque value adjusting means, the improvement which comprises, a compression coil spring within said casing characterized by a series of coils wherein the distance between adjacent coils at one end of the spring is substantially greater than the distance between adjacent coils at the opposite end of the spring with said coils at said one end of said spring serving as hard coils and being adapted particularly for heavy driving conditions and with said coils at said opposite end of said spring serving as soft coils and being adapted particularly for light driving conditions, said spring urging said driven clutch member into driving engagement with said power-receiving clutch member and resisting separation by said camming means until a predetermined torque value is exceeded, the degree of compression of said spring and thus said predetermined torque value being adjustable by said torque value adjusting means through a relatively wide range due to said hard and soft coils of said spring.

4. In a rotary driving tool characterized by a sleeve-like casing, by a spindle therein having a driver supporting means at its forward end, by a driven clutch member connectable to said spindle for rotatably driving same, by a rotatable power-receiving clutch member, by completely disengageable camming means normally directly interconnecting said clutch members and tending to separate said driven clutch member from said power-receiving clutch member at a predetermined torque value, and by torque value adjusting means, the improvement which comprises, a compression coil spring within said casing characterized by a series of coils wherein the distance between adjacent coils at one end of the spring is substantially greater than the distance between adjacent coils at the opposite end of the spring with said coils at said one end of said spring serving as hard coils and being adapted particularly for heavy driving conditions and with said coils at said opposite end of said spring serving as soft coils and being adapted particularly for light driving conditions, said spring urging said driven clutch member into driving engagement with said power-receiving clutch member and resisting separation by said camming means until a predetermined torque value is exceeded, the degree of compression of said spring and thus said predetermined torque value being adjustable by said torque value adjusting means through a relatively wide range due to said hard and soft coils of said spring, the outer diameters of all of the coils of said spring decreasing progressively from the opposite ends of the spring inwardly toward the longitudinal center thereof whereby said spring has a generally hour-glass configuration.

References Cited by the Examiner

UNITED STATES PATENTS

| | | | |
|---|---|---|---|
| 2,161,165 | 6/39 | Hirschman | 267—61 |
| 2,257,759 | 10/41 | Niemann | 64—29 |
| 2,387,264 | 10/45 | Holland | 267—61 |
| 2,728,252 | 12/55 | Connell | 192—56 |
| 3,020,789 | 2/62 | Etzkorn | 81—52 |

FOREIGN PATENTS

| | | |
|---|---|---|
| 508,271 | 7/20 | France. |
| 206,316 | 11/23 | Great Britain. |
| 402,792 | 12/33 | Great Britain. |

DAVID J. WILLIAMOWSKY, *Primary Examiner.*